United States Patent
Cox

(10) Patent No.: US 7,984,002 B2
(45) Date of Patent: Jul. 19, 2011

(54) AUTOMATIC SOURCE CODE GENERATION FOR COMPUTING PROBABILITIES OF VARIABLES IN BELIEF NETWORKS

(75) Inventor: Zachary T. Cox, Barrie (CA)

(73) Assignee: Charles River Analytics, Inc., Cambridge, MA (US)

( * ) Notice: Subject to any disclaimer, the term of this patent is extended or adjusted under 35 U.S.C. 154(b) by 1055 days.

(21) Appl. No.: 11/380,784

(22) Filed: Apr. 28, 2006

(65) Prior Publication Data
US 2007/0027663 A1 Feb. 1, 2007

Related U.S. Application Data

(60) Provisional application No. 60/676,637, filed on Apr. 29, 2005.

(51) Int. Cl.
*G06F 17/00* (2006.01)
*G06N 5/00* (2006.01)
(52) U.S. Cl. .................. 706/45; 706/46; 706/55
(58) Field of Classification Search .............. 706/45, 706/46, 55
See application file for complete search history.

(56) References Cited

U.S. PATENT DOCUMENTS

| | | |
|---|---|---|
| 5,551,770 A | 9/1996 | Hrovat et al. |
| 5,916,016 A | 6/1999 | Botra |
| 5,964,653 A | 10/1999 | Perlov et al. |
| 5,980,361 A | 11/1999 | Muller et al. |
| 6,277,009 B1 | 8/2001 | Chen et al. |
| 6,435,956 B1 | 8/2002 | Ohwada et al. |
| 6,506,105 B1 | 1/2003 | Kajiwara et al. |
| 6,986,359 B2 | 1/2006 | Shajii et al. |
| 2002/0138184 A1* | 9/2002 | Kipersztok et al. .............. 701/29 |
| 2002/0142704 A1 | 10/2002 | Hu et al. |
| 2004/0118403 A1 | 6/2004 | O'Connor et al. |
| 2005/0091012 A1* | 4/2005 | Przytula et al. ................... 703/2 |
| 2005/0091177 A1* | 4/2005 | Przytula ......................... 706/52 |

OTHER PUBLICATIONS

Takagi et al., Tomohiko, "Constructing a Usage Model for Statistical Testing with Source Code Generation Methods", 2004.*
Szolovits, Peter, "Compilation for Fast Calculation over Pedigrees" 1992.*
Draper et al., Denise, "Localized Partial Evaluation of Belief Networks", 1994.*
Berlin et al., A., "Compiling Scientific Code using Partial Evaluation", AI Memo 1145, Jul. 1989, pp. 1-26.*
Bishop C. (1995) Neural networks for Pattern Recognition, Oxford, UK: Oxford University Press.
Daganzo, C. (1979) Multinomial Propit: The theory and its applications to demand forecasting, New York: Academic Press.
Darwiche, A. (2003) A Differential Approach to Interference in Bayesian Networks, Journal of the ACM, 50(3) 280-305.

(Continued)

*Primary Examiner* — Jeffrey A Gaffin
*Assistant Examiner* — Adrian L Kennedy
(74) *Attorney, Agent, or Firm* — McDermott Will & Emery LLP

(57) ABSTRACT

A system for computing probabilities of variables in a belief network includes a data acquisition interface configured to receive data representative of the belief network. The system further includes a partial evaluator configured to carry out a partial evaluation algorithm that determines the probability calculations that must be performed on the received data in order to compute the probabilities of the variables in the belief network. The system further includes a source code generator configured to output the probability calculations as a source code in a programming language.

5 Claims, 5 Drawing Sheets

OTHER PUBLICATIONS

Dechter, R. (1999) bucket Elimination: A Unifying Framework for Reasoning, Artificial Intellegence, 11341-85.

Gamma, E., Helm, R. Johnson, R., and Vliside, J. (1995) Design Patterns: Elements of Reusable Object-Oriented Software, Reading, MA: Addion-Wesley.

Huang, C. & Darwiche, A. (1996) Inference in Belief Networks: A Procedural Guide, International Journal of Approximate Reasoning 15225-263.

Jenson, F.V. (2001) Bayesian Networks and Decision Graphs, New York: Spring Verlag.

Lauritzen, S.L. & Spiegelhalter, D.J. (1988) Local Computation with Probabilities on Graphical Structures and Their Applications to Expert Systems. Journal of the Royal Statistical Society B, 50 (2).

Madsen A. L. & Jensen F.V. (1999) Lazy Propagation: A Junction Tree Algorithm based on Lazy Evaluation. Artificial Intellegence, 113(1-2), 203-245.

Pearl J. (1988) Probabilistic Reasoning in Intelligent Systems: Networks of Plausible Inference, San Mateo, CA: Morgan Kaufmann.

Russell, P. & Norvig, P. (2003) Artificial Intelligence: A Modern Approach (Second Edition ed.) Upper Saddle River, NJ: Prentice Hall.

Shacter, R. D., D'Amrosio, B. & Del Favero, B.A. (1990) Symbolic Probabilistic Inference in Belief Networks. In Proceedings of The 8th Nat'l Conference on Artificial Intelligence (AAAI-90), (pp. 126-131). Boston: MIT Press.

Shafer, G. R. & Shenoy, P.P. (1990) Probability Propagation. An. Math. Artificial Intelligence, 2327-352.

Spiegelhalter, D. (1986) Probabilistic Reasoning in Predictive Expert Systems, In L.N. Kanal & J.F. Lemer (Eds.), Uncertainty in Artificial Intelligence (pp. 47-67) New York: Elsevier/North-Holand.

Zhang, N.L. & Poole, D. (1994) A Simple Approach to Bayesian Network Computations, In Proceedings of The 10th Canadian Conference on Artificial Intelligence (pp. 171-178) Banff, Alberta.

Berlin, A. & Weise, D. (1990). Compiling Scientific Code Using Partial Evaluation. IEEE Computer, 23(12), 25-37.

Jones, N. D., Gomard, C. K., & Sestoft, P. (1993). Partial Evaluation and Automatic Program Generation. Prentice Hall International.

* cited by examiner

AUTOMATIC SOURCE CODE GENERATION FOR COMPUTING PROBABILITIES OF VARIABLES IN BELIEF NETWORKS

CROSS-REFERENCE TO RELATED APPLICATIONS

The present application claims priority under 35 U.S.C. §119(e) to U.S. provisional patent application Ser. No. 60/676,637, filed on Apr. 29, 2005, entitled "Method and Apparatus for Automatic Generation of Source Code for Computing Probabilities of Variables in Bayesian Belief Networks." The co-pending patent application Ser. No. 10/796,723 is assigned to the assignee of the present application, and is incorporated by reference in its entirety.

BACKGROUND

Computerized data models that can predict future data and/or explain past data are helpful in solving real-world problems. These models are especially useful for large and complex data that are difficult for humans to effectively understand. One data modeling technique is probabilistic modeling. Probabilistic modeling provides mathematically rigorous methods for handling uncertainty when modeling a problem domain. Probabilistic modeling has an extremely wide range of applications, including medical diagnoses, bio-informatics, computer vision, signal processing, control systems, cognitive science, and financial modeling.

One probabilistic data modeling technique is Bayesian networks (BN), also known as belief networks, Bayesian belief networks, probabilistic networks, or directed graphical models. A BN consists of nodes connected by directed edges. Each node represents a particular random variable having some number of states. Each edge is directed from a parent node to a child node and represents the causal influence of the parent node on the child node. Each node in a BN has a conditional probability distribution (CPD) associated with it that describes the causal influences of its parents. Bayesian networks are generally used to compute the probabilities that certain events will occur, possibly given the fact that certain other events have already occurred.

Current inference engines that are used to compute probabilities in BNs may have an inherent overhead, because they are written as generic algorithms in high-level programming languages. Further, current inference engines used to compute probabilities in BNs is that they are written by hand by computer programmers in a specific programming language. To use the inference engine in a different programming language, the inference engine may either have to be re-written in the other language or some sort of inter-language communication protocol may have to be used. It may be time-consuming and error-prone to rewrite a complex algorithm such as a BN inference engine in a different programming language. Inter-language communication protocols may have their own overhead and may often be difficult to use effectively. In some cases, an inter-language communication protocol may not even exist for certain programming languages.

A method and system for computing probabilities in BNs without incurring the overhead described above, and without being restricted to a specific programming language, are highly desirable.

SUMMARY

A system for computing probabilities of variables in a belief network includes a data acquisition interface configured to receive data representative of the belief network. The system further includes a partial evaluator configured to carry out a partial evaluation algorithm that determines the probability calculations that must be performed on the received data in order to compute the probabilities of the variables in the belief network. The system further includes a source code generator configured to output the probability calculations as a source code in a programming language.

A method of computing probabilities of variables in a belief network includes receiving data representative of the belief network. The method further includes carrying out a partial evaluation algorithm that determines the probability calculations that must be performed on the received data in order to compute the probabilities of the variables in the belief network. The method further includes outputting the probability calculations as a source code in a programming language.

DETAILED DESCRIPTION

A method and system is described for computing probabilities of variables in a belief network. Partial evaluation is used to determine the calculations necessary to generate the desired probabilities. Through partial evaluation, a modified version of a standard inference algorithm is performed, on the specific Bayesian network for whose nodes the probabilities are being sought. In this way, overhead found in generic inference engines is considerably reduced. Automatic source code generation is performed to output the necessary calculations as a source code. In other words, the necessary calculations are written down and stored in a computer memory, rather than actually being performed.

Figure 1:
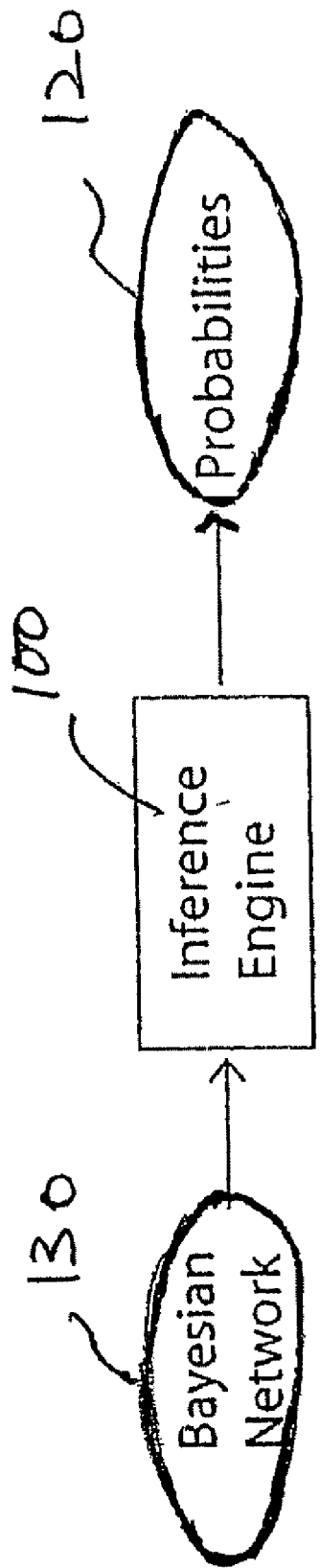
FIG. 1 is a flowchart diagram of a standard generic IE that calculates probabilities of nodes in a BN, by taking as input the BN and produces as output the desired probabilities.

FIG. 1 is a flowchart diagram of a standard generic IE 100 that calculates probabilities 120 of nodes in a BN 130. The IE takes as input the BN 130 and produces as output the desired probabilities 120. The IE is generic, that is, works with any BN.

A BN consists of nodes connected by directed edges. Each node represents a particular random variable having some number of states. Both discrete nodes, which have a finite number of states, and continuous nodes, which have an infinite number of states, can exist in a BN. Each edge is directed from a parent node to a child node and represents the causal influence of the parent node on the child node. Each node in a BN has a conditional probability distribution (CPD) associated with it that describes the causal influences of its parents.

A CPD includes the probability of the node's variable being in a particular state as a function of the states of its parent nodes. There are no restrictions on the types of conditional probability distributions used and each node in the BN can use a different CPD. The CPD for node Child that has n parent nodes $Parent_1, Parent_2, \ldots, Parent_3$, is represented by P(Child|Parent$_1$, Parent$_2$, ..., Parent$_3$), which specifies the conditional probability distribution for Child given the values of all the parent variables.

Bayesian networks are generally used to compute the probabilities that certain events will occur, possibly given the fact that certain other events have already occurred. The BN represents the joint probability distribution of all of its nodes (or variables). If a BN has the nodes X={X$_1$, X$_2$, ..., X$_3$,} the BN represents the joint distribution P(X$_1$, X$_2$, ..., X$_3$)=P(X).

Given a joint distribution, obtaining the probability of a subset of the nodes in the distribution is straightforward using statistical techniques. For example, given two disjoint subsets of the nodes X, X$_1 \subset$X and X$_2 \subset$X such that X$_1 \cap$X$_2$=ø, the joint distribution of the nodes in X$_1$, is obtained by marginalizing out the variables not in X$_1$, represented by $$P(X_1) = \sum_{x/x1} P(X),$$

and similarly for X$_2$, $$P(X_2) = \sum_{x/x1} P(X).$$

The joint probability of any subset of the nodes in a BN is obtained by marginalizing all other nodes out of the joint probability of all the nodes. The conditional probability of X$_1$, given X$_2$, is obtained by dividing the joint distribution of X$_1$ and X$_2$ by the probability of X$_2$, represented by $$P(X_1|X_2) = \frac{P(X_1, X_2)}{P(X_2)}.$$

The joint distribution of X$_1$ and X$_2$ is given by $$P(X_1, X_2) = \sum_{x1(x1,x2)} P(X)/$$

The conditional probability of one xi{x,x,} subset of nodes, given another subset of nodes, is thus obtained by dividing the joint probability of those two subsets by the probability of the second subset. The probabilities of interest to be computed for a BN fall into these two categories: 1) the probability of a subset of nodes in the BN, and 2) the conditional probability of one subset of nodes given another subset of nodes in the BN.

The most common probabilities obtained from a BN are called beliefs. Beliefs are the probability distribution of a single node, possibly given the values of some other nodes. Beliefs without values of other nodes are called prior beliefs. Prior beliefs for the node X are represented as P(X). Beliefs given values of other nodes are called posterior beliefs. Posterior beliefs for the node X are represented as P(X|e). The values of other nodes are called evidence and represented by e.

Other probabilities are also useful. As one example, the joint probability of a node Q and a node F,P(Q,F\e), is used in the calculation of mutual information. As another example, the joint probability of a node X and its parents, P(X,parents (X)), is used when learning the CPD of X from data. The present disclosure covers all probabilities that can be computed for a BN and is not limited to any specific type of probability.

The probabilities for the nodes in the BN are calculated using the CPDs and the evidence. A separate inference engine (IE) may typically be used to do these calculations. Many different IEs have been developed and used. Typically, an IE may be built from a particular BN and may then be used to compute probabilities using any evidence. The CPDs and evidence are inputs to the IE, and probabilities are the outputs. But only the evidence, not the CPD, can change at run-time. If the CPD of any node in the BN changes in any way the IE must be built again before probabilities can be calculated again.

The evidence e specifies the events that have already occurred. In particular, the evidence provides a real number between zero and one (inclusive) for each state of each node that represents an event that has already occurred. These numbers represent the independent likelihood of the states for each observed node. In a typical BN, observations are obtained for some variables in the BN, and probabilities are then calculated for other nodes. Either the human operator or the computer then uses these probabilities to make decisions.

Current inference engines used to compute probabilities in BNs are written as generic algorithms in high-level programming languages, and thus have an inherent overhead. Each algorithm can compute the probabilities of any BN. Typically, significant overhead can be introduced into general-purpose algorithms that are useful to solve a wide range of problems, the overhead not being necessary to solve a specific problem relating to a particular input.

The inference engines used to compute probabilities for a BN tend to be generic algorithms that can compute the probabilities for any BN. Generic algorithms such as these may be very useful, since a single algorithm can be used to solve a wide class of problems, as opposed to a problem-specific algorithm that can only be used to solve a special type of problem. Generic algorithms may suffer from performance overhead, however, since they need to compute, at run-time, those computations that are necessary to perform the specific problem being solved. Generic BN inference engines may also have to compute, at run-time, those computations that are necessary to perform to calculate probabilities for the specific BN they are currently working with. This adds to the overhead.

A BN is a representational model (RM). It represents, or models, some domain of interest. However, in practice, computations are not performed on the actual BN. The BN first must be converted to a computational model (CM) and then an inference engine (IE) uses the CM to calculate beliefs. Many different types of IEs use the CPDs and evidence of the BN to compute beliefs. Different IEs may use different types of CMs and different algorithms for operating on the CM to compute the beliefs.

When a modification is made to the BN that affects a CPD, the CM must be reconstructed. The IE may use this new CM to calculate beliefs. Reconstructing the CM can also be described as rebuilding the IE. When a modification is made to the BN that affects evidence, the CM typically does not need to be reconstructed. The IE just needs to incorporate the new evidence and recalculate beliefs.

Junction Tree (JT) inference engines are one of the most popular inference engines for computing probabilities. A JT is a tree constructed from the BN in which each vertex is a set of nodes from the BN that form a clique, and each vertex in the JT on the path from vertex i to vertex j contains the intersection of the nodes of vertices i and J. The vertices of a JT may be referred to as cliques, and the edges of a JT may be called separators.

One example of a JT inference engine is the Hugin JT inference engine. In the Hugin JT inference engine, each clique i has an object Φ, called a potential, associated with it. Each separator connecting cliques i and j also has a potential $\Phi_{ij}$. Initially $\Phi_i$ is the product of all CPTs and evidence potentials assigned to clique i and $\Phi_{ij}$ consists of all ones. A clique is chosen to be the root of the tree, and then messages are passed in two phases: from the leaves of the tree towards the root and then from the root towards the leaves. After all messages have been passed, beliefs are calculated from the clique potentials.

Each message from clique i to clique j causes the separator potential $\Phi_{ij}$ and the clique potential $\Phi_j$ to be updated as follows:

$$\Phi_{ij}^{old} = \Phi_{ij}. \qquad 1$$

$$\Phi_{ij} = \sum_{C \setminus S} \Phi_i. \qquad 2$$

$$M_{ij} = \frac{\Phi_{ij}}{\Phi_{ij}^{old}}. \qquad 3$$

$$\Phi_j = \Phi_j M_{ij}. \qquad 4$$

In the above equations, C is the set of nodes assigned to clique i and S is the set of nodes assigned to separator (i,j). After the two phases of message-passing in the JT each clique potential represents the joint probability of the nodes assigned to it and the evidence: $\Phi_i = P(C,e)$. Thus, beliefs for node $X \in C$ are calculated by marginalizing the other nodes out of the clique potential $\Phi_i$ and then normalizing:

$$P(X \setminus e) = \alpha \sum_{C \setminus \{X\}} \Phi_i.$$

The above algorithm requires the definition of multiplication, division, and marginalization of potentials. These three operations create a new potential from the original potential(s) obtained by multiplying, dividing, or adding, respectively, elements of the original potential(s).

The above algorithm as described, and implemented in current JT-based inference engines, works with any JT and any potentials. When a message is being passed from clique i to clique j, the algorithm incurs several types of overhead:

Creating the temporary potential $\Phi_{ij}^{old}$
Computing which elements of $\Phi_i$ to add to create the new $\Phi_{ij}$
Creating the message potential $M_{ij}$
Computing which elements of $\Phi_j$ and $M_{ij}$ to multiply to create the new $\Phi_j$ The JT-based inference engine also incurs overhead by keeping the JT and related data structures in memory, computing which cliques to send messages to, initialization of the clique potentials, marginalization of clique potentials to compute beliefs, etc. This overhead means slower execution time and increased memory usage for calculating beliefs.

Another type of inference engine, called AMG, avoids much of the overhead of JT-based inference engines by representing all of the multiplications and additions in an Add-Multiply Graph (AMG) (also called an Arithmetic Circuit).

The AMG is constructed from the JT by starting at the root clique and going towards the leaves of the JT, adding addition and multiplication operations to the AMG corresponding to the configurations of clique and separator nodes that are added and multiplied during the JT inference algorithm. Thus, the AMG represents explicitly which elements of the clique and separator potentials to add and multiply, reducing much of the overhead inherent in the JT-based inference engine.

The AMG-based inference engine also has its own overhead, however, including storing the AMG data structure and traversing through the AMG to calculate beliefs.

In one embodiment of the present disclosure, the overhead described above may be avoided by using the technique of partial evaluation or specialization. Many computer programs are currently written in a very generic way in a high-level language, including but not limited to C++, Java, and Lisp. In this way, they can be used on any input data and be developed fairly quickly. There are performance costs associated with a generic computer program written in a high-level language. These costs include maintaining abstraction mechanisms, dynamic memory allocation, and object-method dispatching.

Partial evaluation transforms a general-purpose algorithm that will work with any input data into a specialized algorithm that works only with some specific input data. By working with specific input data, many of the performance penalties of the generic algorithm can be removed. As one example, a generic function may compute the inner product of two vectors. The inner product of two vectors $v_1$, and $v_2$ is defined as:

$$v_1, v_2 = \sum_{i=1}^{n} v_1[i] v_2[i]$$

The inner product may be implemented generically in a high-level programming language as follows:
    function inner-product1(vector v1, vector v2)
    if (length(v1)!=length(v2))
    fail
    result=0
    for (i=1 to length(v1))
    result=result+(v1[i]*v2[i])
    return result If, for a specific problem, it is known that the length of the two vectors is 3. The inner-product1 function can then be simplified to:
    function inner-product2 (vector v1, vector v2)

return v1[1]*v2[1]+v1[2]*v2[2]+v1[3]*v2[3]

By using partial evaluation to incorporate knowledge of the input data, much of the overhead of the original general-purpose inner product algorithm has been eliminated. No length checking of the vectors is needed. No intermediate result variable is needed. No for-loop overhead (maintain i variable, increment i and check i against vector length each iteration). Calculations can be parallelized (perform multiplications in parallel then add products together) on some special-purpose processors.

In some cases, the elements of vector v1 are known at compile-time. Suppose we know that v1=[3, 2, 5]. The inner product algorithm can then be partially evaluated even further:
    function inner-product3(vector v2)

return 3*v2[1]+2*v2[2]+5*v2[3]

Now the function only takes a single argument and the elements of v1 can be stored in program memory instead of taking up valuable space in random access memory (RAM). The inner product algorithm can be optimized more if some of the elements of v2 are known at compile-time. Suppose the last element is known to be 10:

function inner-product4(vector v2)

return 3*v2[1]+2*v2[2]+50

The last multiplication can be computed at compile-time and stored in program memory so it does not have to be computed at run-time.

In addition to overhead, another feature of generic inference engines used to compute probabilities in BNs is that they tend to be written by hand by computer programmers in a specific programming language. To use the inference engine in a different programming language, therefore, the inference engine must either be re-written in the other language or some sort of inter-language communication protocol must be used. It may be time-consuming and error-prone to rewrite a complex algorithm such as a BN inference engine in a different programming language, and inter-language communication protocols have their own overhead and are often difficult to use effectively. An inter-language communication protocol may not even exist for two specific programming languages, preventing this from even being a possibility.

A computer science technique called automatic source code generation can be used to solve this inflexibility. A Source Code Generator (SCG) is a computer program that writes another computer program that does something. The programming languages that the two programs are written in can be different. In general, the SCG helps the user to build some model and then generates a computer program that does something with that model, so the user doesn't have to write the computer program by hand. The generated source code can then be compiled into machine code and executed on a processor, just like hand-written source code.

Figure 2:
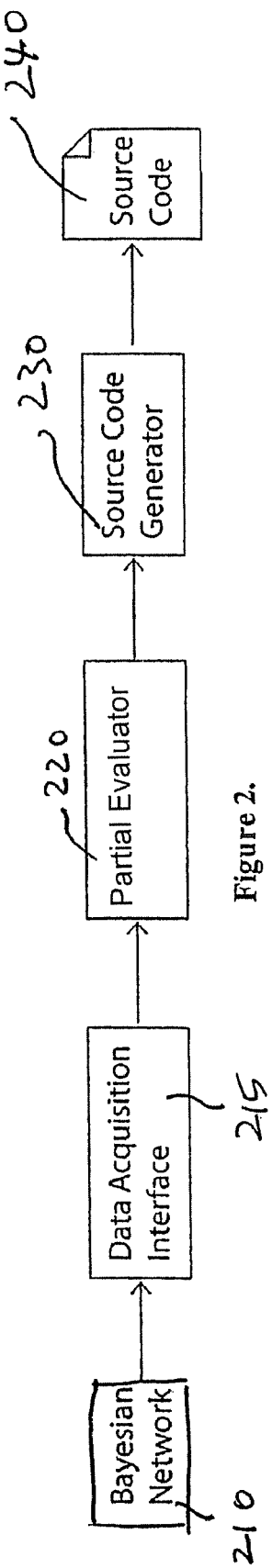
FIG. 2 is a flowchart diagram for generating source code that computes probabilities of nodes in a BN.

FIG. 2 is a flowchart diagram for generating source code that computes probabilities of nodes in a BN. In overview, a system n accordance with one embodiment of the present disclosure receives data representative of a BN 210, through a data acquisition interface 215. Then a partial evaluator 220 uses a partial evaluation algorithm to determine the calculations required to calculate the desired probabilities for the BN 210. In other words, a standard inference algorithm is modified by partial evaluation, to store in memory the calculations it would perform in order to compute the probabilities, instead of actually carrying out those calculations. Then a source code generator 230 outputs the probability calculations in a source code 240 in a desired programming language.

In one embodiment of the present disclosure, a development application is provided that produces a high level programmatic representation of a specific BN. The high level programmatic representation may be pseudo code, source code or other suitable representation. In some embodiments, the development application allows a user to select the specific high level programmatic representation.

The development application may be a software program written in any suitable programming language. For example, the development application may be written in the Java programming language, but other programming languages such as C++ may be used. The development application may execute on a computer work station or other suitable computer. The development application may run on a computer with single processor or any combination of multiple or networked processors.

In some embodiments, the representation of the BN may be supplied by a user. In such embodiments, the workstation, or other processor, executing the development application may have a user interface allowing a human user to input parameters describing the BN. An example of a suitable interface may be found in co-pending application Ser. No. 60/591,269 entitled "Modeless User Interface Incorporating Automatic Updates for Developing and Using Bayesian Belief Networks" filed Jul. 26, 2004 in the name of Cox, et al. The description of the BN may also be provided by a user in any other suitable way. Further, the method and system described in the present disclosure is not limited for use in connection with BNs specified by a human user. Specification for the BN may come from other sources, including other programs or development applications.

The data describing the BN may be stored in any suitable form. In some embodiments, the data describing the BN may be stored in one or more data structures in computer readable memory associated with the work station or processor on which the development application executes. Such a data structure may, for example, store representations of cliques and separators and other data associated with each of the cliques and separators.

The development application may output the high level programmatic representation of the BN in any desired form. The output may be presented for example, presented on a computer display, on a paper printout or in an electronic file of any desired format. In the embodiments described below, the output is in the form of an electronic file, allowing for further computer processing of the high level programmatic representation of the BN. In the specific example where the programmatic representation is in the form of source code, the file may be in a format as is traditionally used to provide source code to a compiler or other processing tool. In this way, the programmatic representation may be further processed, such as by converting it to an executable file. Such an executable file may then be executed on the work station or other processor containing the development application. Alternatively, the executable file may be loaded into one or more other device with a computers or processors for execution. As a specific example, the executable file may be loaded into a handheld device or other processor having significantly less processing capability than the workstation on which the development application executes. Alternatively, multiple copies of the executable file may be made and distributed throughout an enterprise, thereby allowing multiple users throughout the enterprise to use the same BN consistently for decision making.

In one embodiment, the probability equations that calculate beliefs for a specific BN may be represented in the source code of a programming language directly, so that probabilities for a specific BN can be computed by simply instructing a processor to multiply, add, and divide numbers, instead of relying on complex generic data structures and a corresponding complex generic algorithm to compute the probabilities for any BN.

The BNs for which the development application generates source code for computing probabilities may contain both discrete and continuous nodes with no restrictions on topology or CPDs. Such a BN is commonly referred to as a hybrid Bayesian network (HBN). A BN with only discrete or only continuous nodes may be similarly processed.

The BNs for which the development application generates source code for computing probabilities may contain temporal edges. A temporal edge is directed from a parent node to a child node in the BN and represents the parent node causing the child node in the next time step. Such a BN is commonly referred to as a dynamic Bayesian network (DBN). DBNs may typically only contain discrete nodes. The present disclosure may also include, however, DBNs with both discrete and continuous nodes. These are commonly referred to as dynamic hybrid Bayesian networks (DHBN).

The development application may generate source code for calculating any probabilities of nodes in the BN. As described above, this includes calculating the joint probability of a subset of nodes in the BN, $P(X_1)$, and calculating the conditional probability of one subset of nodes in the BN given another subset of nodes in the BN, $P(X_1|X_2)$. Common probabilities such as beliefs, $P(X|e)$, the joint probability $P(Q,F|e)$ used in mutual information, and the joint probability $P(X, parents(X)|e)$ used in learning are all special cases of these generic probabilities. A development application is not limited to these specific probabilities however, and may process a BN that generates any probability or multiple types of probabilities.

Although an exemplary embodiment has been described for calculating beliefs in a BN with only discrete nodes, the method and system described in the present disclosure is not limited to such probabilities and/or BNs, but rather includes generating source code for calculating all probabilities in DHBNs. The embodiment described below can be adapted to any standard inference engine that can be used to calculate the desired probabilities in the desired type of BN.

A development application may use the method illustrated in FIG. 2, discussed above. In FIG. 2, a specific BN is provided to the system as input, through the data acquisition interface. The partial evaluation algorithm then determines all of the calculations required to produce the desired probabilities in the BN. These calculations are then output by the source code generator as source code in the proper syntax of a programming language.

Figure 3:
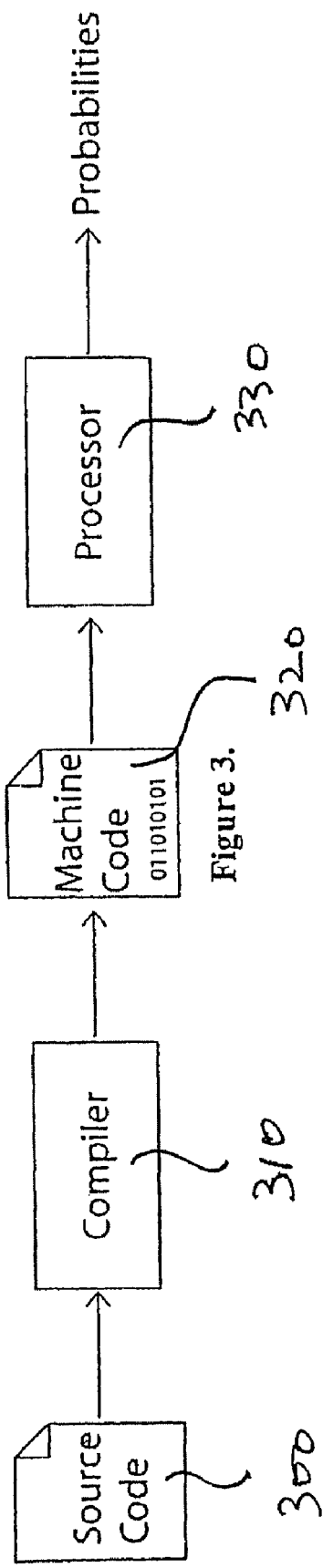
FIG. 3 is a flowchart diagram for compiling and executing the source code generated as in FIG. 2.

FIG. 3 is a flowchart diagram for compiling and executing the source code generated as in FIG. 2. FIG. 3 illustrates how a source code 300 is executed to produce the probabilities. A compiler 310 takes as input the generated source code and produces as output machine code 320 for a specific processor 330. The processor 330 then executes the compiled machine code and thus calculates the desired probabilities for the BN. Any compiler 310 suitable for the programming language the source code was generated in can then compile the output source code.

One technique to generate source code in a programming language for computing probabilities uses partial evaluation to traverse the AMG to calculate probabilities, but instead of performing the calculations directly, the calculations that would be performed are output as code. This is, in effect, a modification to a traditional inference engine such that the result is the instructions that would be performed by the inference engine, instead of actually performing those instructions. Any compiler for that specific programming language can then compile this source code and it can be used to compute probabilities for that BN.

Beliefs for a BN are multi-linear functions of CPT entries and evidence values. A multi-linear function is a polynomial of degree at most one. Therefore, the belief equations consist of multiplications and additions of CPT entries and evidence values. These multiplications and additions may be represented in an AMG, and an algorithm made be implemented for traversing the AMG to calculate beliefs.

The belief for state j of node i is defined to be $b_j^i = \lambda_j^i.value * \lambda_j^i.derivative$, where $\lambda_j^i$ is the evidence vertex in the AMG for that particular state. Thus, to compute the belief of a particular state of a particular node in the BN, the belief traversal algorithm starts at the corresponding evidence vertex in the AMG of that state and proceeds through the AMG as follows:

Where v is any vertex in the AMG, p is a parent of v, v' is one of p's other children besides v, and c is a child of v. The derivative of the root vertex of the AMG is defined to be 1. The value of a leaf vertex is either a CPT entry or an evidence value. Once the value or derivative of a vertex in the AMG has been calculated, it may be cached so that it does not need to be calculated again. In this way, partial calculations can be reused, which greatly speeds up the belief calculations.

In one embodiment, the above traversal algorithm may be modified slightly in order to generate source code for calculating beliefs. Instead of actually performing the additions and multiplications, a list of variable assignments may be generated during traversal. Each element of the list represents the expression for a value or derivative of a vertex in the AMG, and it references the value and derivative of other vertices in the AMG.

In the original AMG algorithm described above, these values and derivatives would actually be calculated, instead of generating code that represents the calculations. The list would be generated such that variables referenced in an assignment are themselves declared and assigned before that assignment to prevent illegal forward references and to ensure the referenced variables have already been assigned their proper value. Also, each variable would only be declared once, although it subsequently may be referenced many times.

After the modified belief traversal algorithm is finished, the list may be transformed into source code by iterating over each element, and outputting each variable assignment to a text file. This text file may be a pre-existing source code file called a template file, in which case the variable declarations would be inserted at a specific position within the source code file. It may also be a plain text file, in which case a developer would then insert the text into a source code file by hand.

In general, each element of the variable assignment list may represent one line of source code in which a variable is optionally declared and is then assigned the result of adding and multiplying other previously defined variables, CPT entries, evidence values, and/or constant values. For example, an element may represent a variable called m3 that is assigned the product of m1, c1, and e1 added to the product of m2, c2, and e2. This element may already be a string of characters that represent the line of source code in a programming language to be output to a source code file.

The element may also be some data structure that represents the multiplication and addition of the variables and the assignment of the result to m3. In this case, the element itself or some other part of the system must be able to convert the element into a string of characters that represents the line of source code in a programming language to be output to a source file. Different modules can be provided that translate the element into valid source code for different programming languages. For example, the element for m3 could be output in lava syntax as:

double $m3 = m1*c1*e1 + m2*c2*e2$;

In another embodiment, variables m1, m2, and m3 may actually be elements of an array that is declared elsewhere in the source code. The generated source code statements may, for example, be added to a file, a programming project, or other artifact in a program development environment that contains supporting code, such as input and output code. Such an artifact may also contain structures providing a shell of functions for methods, or other programmatic objects into which source code statements may be inserted. In this case, the element for m3 could be output in Java syntax as:

$$m[3]=m[1]*c1*e1+m[2]*c2*e2;$$

In most cases, the source code for calculating probabilities cannot stand by itself in the source code file. Rather, it needs to be contained in some function or method and also needs to be supported by some kind of input and output code. To continue the example of generating Java source code, the belief equations could be contained in a method provided below:

```
public void calculateBeliefs( )
(m[1] = e1 * c1;
m[2] = e2 * c2;
m[3] = m[1] * c3 * e3 + m[2] * c4 * e4;
)
```

This calculateBeliefs method would then be called by some other function or method when beliefs need to be recalculated. Details on when beliefs need to be recalculated and how this can be detected and carried out can be found in the co-pending application Ser. No. 60/591,269 entitled "Modeless User Interface Incorporating Automatic Updates for Developing and Using Bayesian Belief Networks" filed Jul. 26, 2004 in the name of Cox, et al., and incorporated herein by reference in its entirety.

The input to the generated source code module may generally be new evidence for nodes in the BN. This may be triggered by the availability of new or updated information in the system in which the generated source code is used. The generated source code may also provide a function or method for clients to call to set this new evidence.

In Java, for example, this may be performed as follows:

```
public void setEvidence(int variable, double( ) evidence)
{
modified = true;
    for (int i = 0, length = evidence.length; i < length; ++i)
    {
e[variable][i] = evidence[i];
}
```

In this case, evidence may be stored in the two-dimensional array e [ ] [ ]. Clients may call the method, specifying the variable for which new evidence has been obtained and also the new evidence for the variable. The code may set the proper values of the e [ ] [ ] array for later use in the probability calculation code (i.e. the calculateBeliefs method given previously as an example).

If CPT entries are allowed to change at run-time, the generated source code may also contain a function or method to allow clients to change them. This may be another form of input to the BN, similar to the input of new evidence. CPT entries may be changed at run-time in a system that adapts to new data over time, to model the system better over time. This may be referred to as on-line learning.

One example of such a method in Java is provided below:

```
public void setCpt(int variable, int configuration, double probability)
{
modified = true;
c[variable)(configuration) = probability;
```

In this case, CPT entries are stored in the two-dimensional array c[ ] [ ]. Clients call the method specifying the variable whose CPT is to be changed, the configuration representing the entry to be changed, and the new conditional probability value. The code sets the proper value of the c[ ][ ] array for later use in the probability calculation code (i.e. the calculateBeliefs method given previously as an example). Note that if CPT entries are not allowed to change at run-time (one optimization hard-codes them for simplification) then this method would not be provided.

The outputs of the generated source code are the desired probabilities for nodes in the BN. There may generally be one or more functions or methods to allow clients to obtain these probabilities. This function or method generally first checks to see if the probabilities need to be recalculated, and if so it will call the function or method that contains the probability calculation code. Next it returns the desired probabilities.

For calculating beliefs in Java, the following may be performed:

```
public double[ ] getBeliefs(int variable)
{
if (modified)
{
calculateBeliefs0( );
}
return b[variable]; }
}
```

If any modifications were made this method first calls the calculateBeliefsO method to re-calculate beliefs and then returns the beliefs for the specified variable.

In one embodiment of the present disclosure, the data structures and algorithms for the BN, JT, and AMG may be written in Java, and the source code for calculating beliefs was be generated for Java.

Figure 4:
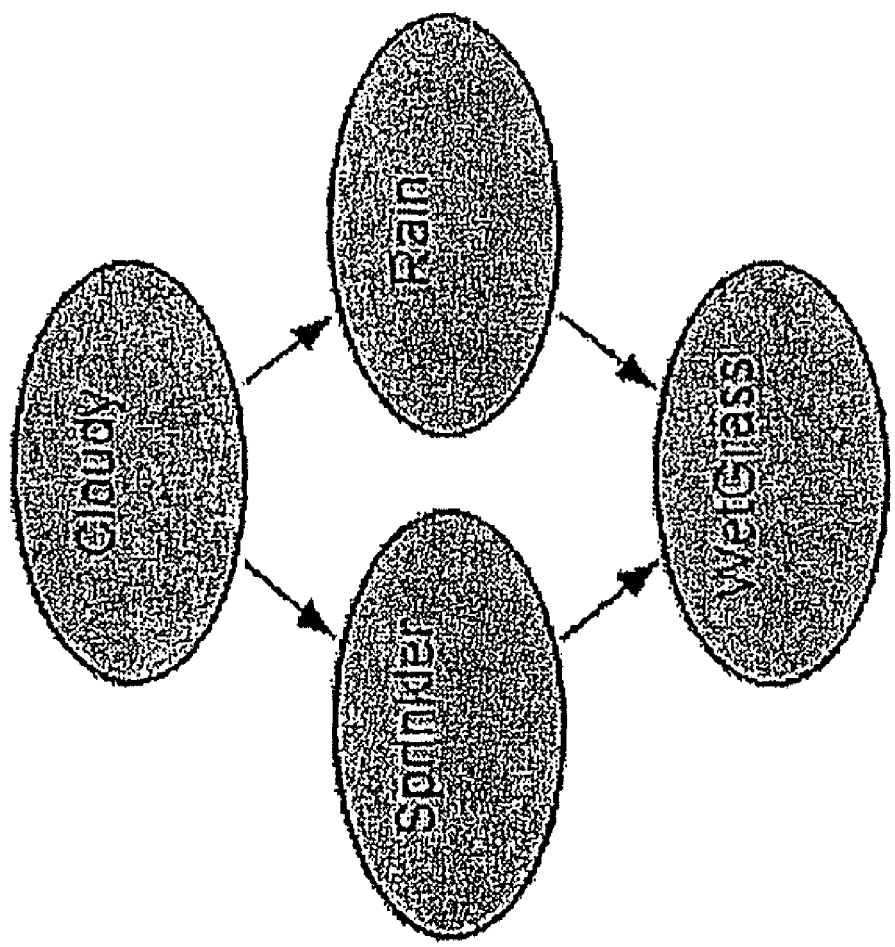
FIG. 4 illustrates is a simple BN that models weather and wet grass.

FIG. 4 shows a simple BN. In the BN illustrated in FIG. 4, the BN nodes have the following indices: Cloudy=2, Rain=3, Sprinkler=0, WetGrass=1. These BN nodes all represent random variables. The variables can take on some state, however it is uncertain as to what states these can take on. The edges connecting these nodes represent causal relations. From FIG. 4, therefore, it can be seen that clouds cause rain, and then rain causes grass to get wet. Because there is no edge directly from Cloudy to WetGrass, clouds don't directly cause grass to be wet, however they do cause the grass to be wet by rain. As explained earlier, associated with each of these nodes is a conditional probability distribution, which quantifies the effects of a parent node on a child node.

Figure 5:
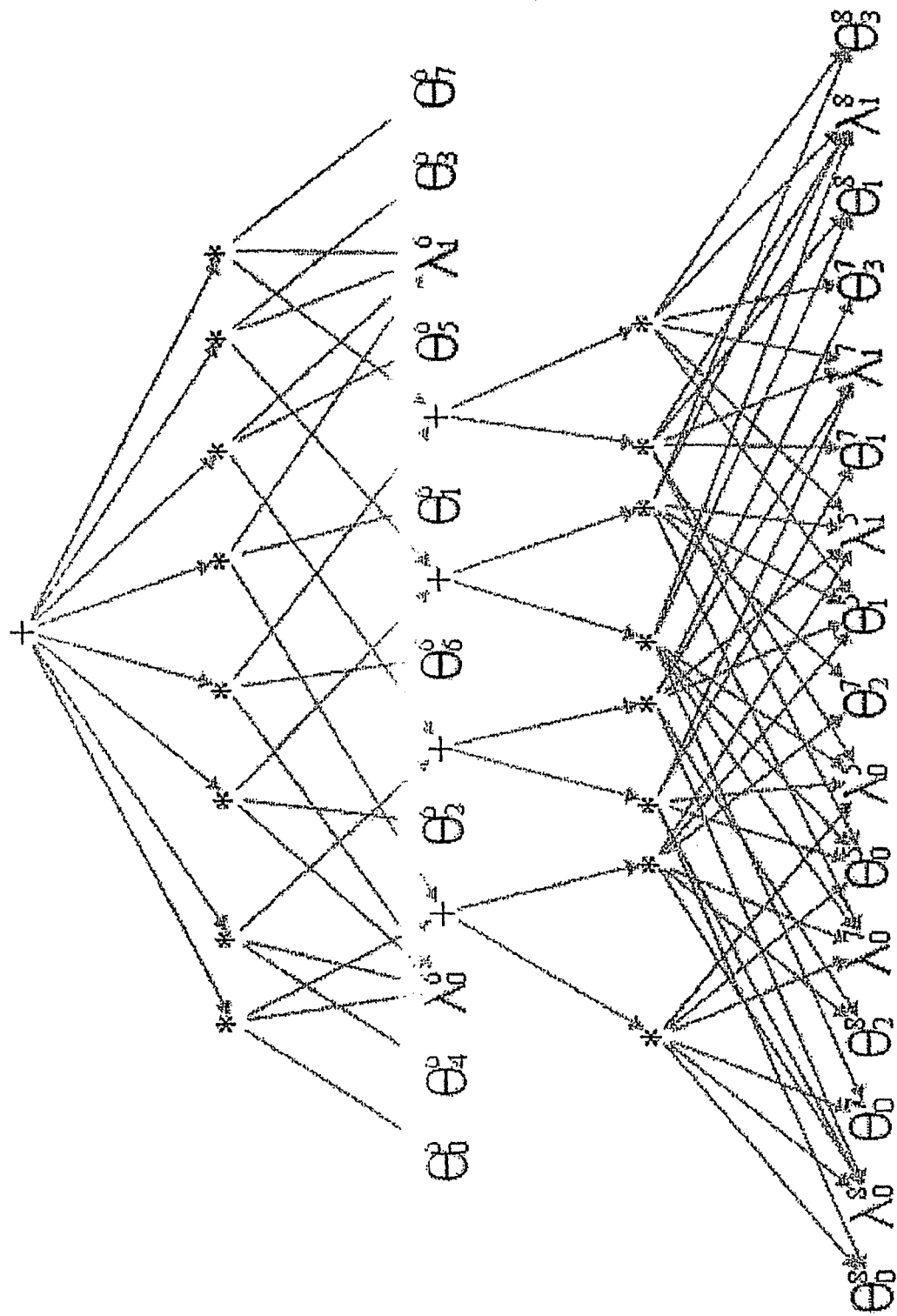
FIG. 5 illustrates an AMG for computing beliefs in the BN of FIG. 4.

FIG. 5 shows the AMG for this BN. As an appendix to the present application, an example is shown of an automatically generated source code for calculating beliefs in this BN. The source code was generated by inserting information into a pre-created template file, such as node and state names, CPT entries, and belief equations for the specific BN. The code represents a Java class that can be instantiated and used (i.e. post evidence and get beliefs). The belief equations are contained in the computeBeliefs method. Although this code will only compute beliefs for the simple BN, all overhead of a generic inference engine is eliminated, and only those additions and multiplications needed to compute beliefs are performed.

The present disclosure is of course not limited to generating source code in the Java programming language. Source code for computing beliefs can be generated for any programming language that supports storing numbers in variables and the addition, multiplication, and division operations. Some examples include, but are not limited to, assembly, C, C++, C#, Perl, Lisp, VisualBasic, Fortran, Basic, Scheme, Smalltalk, Cobol, Haskell, Matlab, Mathematica, and Pascal. To extend the development application applies to one or more other programming languages, the variable assignments and belief equations are generated in the proper syntax of the language and the belief equations are contained in some kind of function appropriate to the language. The development application may contain one or more modules or other components that generate variable assignments and belief equations, with one such module available for each programming language in which source is to be generated. A user may specify which language is to be used and the appropriate module could then be invoked.

Optimizations may be made to the AMG, and thus, to the generated belief equations. These optimizations may use the principle of partial evaluation to simplify the belief equations using as much information about the BN that is known at compile-time. One simplification may be obtained by fixing the CPT entries to their values at compile-time. Since these values will not change at run-time, calculations involving them can be partially computed at compile-time. This simplification is similar to the inner-product example discussed above.

As one example, the following calculation may appear in a generated source code:

$$x=c1*c2*c3*e1+c4*c5*c6*e2$$

If the CPT entries c1, c2, c3, c4, c5, and c6 are known to take on the values 0.1, 0.2, 0.3, 0.4, 0.5, and 0.6, respectively, and will not change at run-time, then this calculation can be simplified to:

$$x=0.006*e1+0.12*e2$$

In practice, not all nodes in the BN may receive evidence. Usually, only a subset of the nodes in a BN may receive evidence, depending on the type of information that can be collected from a specific system. By fixing the probabilities of the nodes for which probabilities will not be changed through posting of evidence, the generated code may be simplified.

Another simplification may arise by setting all evidence values of non-evidence nodes in the BN to one. This is mathematically valid since evidence of all ones represents no evidence for a node. Since multiplication of a number with one is the number, the corresponding evidence vertices can effectively be removed from the AMG.

Further, beliefs may not be needed in practice for all nodes in the BN. Usually only a subset of the nodes in a BN may ever need to have their beliefs computed, depending on which beliefs are needed to take action or make a decision in a certain system. In some cases, the belief traversal algorithm may have been specified to compute beliefs for all nodes in the BN. By simply restricting the evidence vertices to those for needed beliefs in which the traversal algorithm starts, however, unneeded beliefs may not have to be calculated, and the corresponding source code for computing those beliefs will not be generated.

Yet another optimization may remove any term of the equations that is multiplied by zero. Since any number multiplied by zero is zero, this term would not contribute to the equation and would just waste computations at run-time. In general, any optimization used to create compiled code may be applied.

If a term in the equations is added by a value of zero, the addition does not need to take place since zero added to any number is that number. Similarly, if a term in the equations is multiplied by a value of one, the multiplication does not need to take place since any number multiplied by one is that number. These are two additional optimizations that can simplify the probability calculations.

The three optimizations discussed above remove calculations involving the values one and zero. In an additional optimization technique, first values below a pre-specified lower bound can be set to zero and values above a pre-specified upper bound can be set to one. This produces more ones and zeros that can be eliminated using the other optimizations.

Some programming languages specify that the compiled machine code of a particular function or method cannot exceed a pre-specified amount. For example, the compiled bytecode of a method in Java cannot exceed 65,535 bytes due to limitations in the Java bytecode instruction set. Other languages have similar restrictions. Because many calculations may be required to compute probabilities in large BNs, the compiled calculations can easily exceed these limits. To prevent this from occurring, an extra processing step can be included in the source code generation step. A running count of the required instructions may be kept, and the calculations may be split up among multiple functions or methods, so each one does not exceed the specified limit of the programming language.

Another use of the above described application is to represent the probability equations that calculate beliefs for a BN in the hardware of a computing device directly, so that probabilities for a specific BN can be computed by simply multiplying and adding numbers, instead of relying on generic data structures and a corresponding generic algorithm to compute the probabilities. Examples of hardware may include, but are not limited to, electronic circuits, Field Programmable Gate Arrays (FPGA), Application-Specific Integrated Circuits (ASIC), biological computers, molecular computers, and quantum computers.

To create or program a hardware device to calculate the probabilities of a BN, typically the system described above may output the probability equations in a certain programming language used to create or program hardware devices. One example of such a language is Verilog. After generating the source code for the hardware device, the source code may then be used to physically create or program a hardware device. In this way, the probability calculations may be carried out directly in hardware, instead of being represented as machine code instructions for a processor to execute.

There are many ways to initiate the automatic generation of software or hardware for calculating the beliefs of a BN. One simple method may be to provide a single button in an application for graphically developing BNs, which when pushed either generates the source code or provides the user of the application a screen to adjust settings of the code generation process, and then after the user adjusts the settings generates the source code. Another method may be to provide a stand-alone computer program that takes as input the specification of a BN and produces as output the software or hardware to compute the beliefs of that BN. Another method may be to provide a library that takes as input a BN and produces as output the source code for calculating probabilities of that BN.

The software for computing probabilities in a BN produced by a development application as described above may be used in many different ways in many different systems. Some examples include, but are not limited to: a software component in a larger software system used to compute the probabilities of a specific BN; a software component interfaced to hardware of a system used to compute the probabilities of a specific BN; and part of a library of BNs used by other software or hardware components The hardware for computing probabilities in a BN produced by a development application as described above may be used in many different ways in many different systems. Some examples include, but are not limited to: a stand-alone hardware device interfaced to other hardware devices for computing probabilities of a specific BN; a stand-alone reprogrammable hardware device that can be reprogrammed to compute probabilities for different BNs; and hardware that is contained in a larger hardware system for computing the probabilities of a BN.

In sum, methods and systems have been described for computing probabilities, as well as a development application that generates programmatic representations of a model for computing probabilities. In one exemplary embodiment described above, the method begins by receiving a Bayesian network and then uses a standard inference algorithm that is modified to store the calculations it would perform to compute the probabilities instead of actually carrying out those calculations. The probability calculations are then output in the proper syntax of a programming language such that other code in the same programming language can interface with it, such as to request it to calculate the probabilities of variables in the Bayesian network. The programming language of the output source code can be different than the programming language that the Bayesian network and modified inference engine are written in.

While certain embodiments have been described of a system and method for computing probabilities of variables in a belief network, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

APPENDIX

Automatically Generated Source Code For Calculating Beliefs In The BN Shown In FIG. 4

```
public class Weather
{
    /////////////////////////////////////////////////////////////
    // creation API
    public weather( )
    {
        n = new String[ ] {"Rain", "Sprinkler", "WetGrass", "Cloudy"};
        s = new String[ ][ ] {{"No","Yes"}, ("No","Yes"), {"No","Yes"}, {"No","Yes"}};
        c = new double[ ][ ]
    {{0.8,0.2,0.2,0.8},(0.5,0.5,0.9,0.1), {1.0,0.0,0.1,0.9,0.1,0.9,0.01,0.99}, (0.5,0.5}};
        e = new double[s.length][ ];
        ed = new double[s.length][ ];
        for (int i – 0, length = s.length; i < length; ++i)
        {
            e[i] = new double[s[i].length];
            ed[i] – new double[s[i].length];
            for (int j = 0, length2 = s[i].length; j < length2; ++j)
            {
                e[i][j] = 1.0;
            }
        }
        b = new double[s.length][ ];
        for (int i = 0, length = s.length; i < length; ++i)
        {
            b[i] = new double[s[i).length];
        }
        int[ ] mlengths = (8, 8);
        mv = new double[mlengths.length][ ];
        md = new double[mlengths.length][ ];
        for (int i=0, length=mv.length; i<length; ++i)
        {
            mv[i] = new double[mlengths[i]];
            md[i] = new double[mlengths[i]];
        }
        int[ ] alengths = (4);
        av = new double[alengths.length][ ];
        ad = new double[alengths.length][ ];
        for (int i=0, length=ay.length; i<length; ++i)
        {
            av[i] = new double[alengths[i]];
            ad[i] = new double[alengths[i]);
        }
    }
    /////////////////////////////////////////////////////////////
    /////////////////////////////////////////////////////////////
```

APPENDIX-continued

Automatically Generated Source Code For Calculating Beliefs In The BN
Shown In FIG. 4

```
// beliefs API
public double[ ] getBeliefs (int variable)
{
  if (modified)
    calculateBeliefs0( );
  }
  return b[variable];
}
private void calculateBeliefs0( )
{
  md[0][0]=1.0;
  md[0](4)=1.0;
  ad[0][0]=md[0][0]*c[2][0]*e[2][0]+md[0][4]*c[2][1]*e[2][1];
  md[1][0]=ad[0](0];
  md[l][4]=ad[0][0];
  md[0][2]=1.0;
  md[0][6]=1.0;
  ad[0][2]=md[0][2]*c[2][4]*e[2][0)+md[0][6]*c[2][5]*e[2](1);
  md[1][2]=ad[0][2]; md[1][6]=ad[0][2];
  ed[0][0]=md(1)(0)*c[0][O]*c[1][0]*e[1][0)*c[3][0]*e[3][0]+md[l][4]*c[0][2]*c[l][2]*e[1]
  [0]*c[3](11*e[3][1]+md[1.)[2]*c(0][0]*c[1](1]*e[1][1}*c[3][0]*e[3](0)+md[l][6]*c[0][2]*
  c[l][3]*e[1][1]*c[3][1]*e[31[1);
    md(0)[1]=1.0;
    md[0][5]1.0;
    ad[0][1]=md[0][i]*c[2][2]*e[2][0]+md[0][5]*c[2][3]*e[2][1];
    md[1][1]=ad[0][1]; md[1][5]=ad[0][1]; md[O][3]=1.0;
    md[0][7]=1.0;
    ad[0][3]=md[0][3]*c[2][6]*e(2][0]+md[0][7]*c[2][7]*e[2][1];
    md[1](3)=ad[0](3); md[1][7]=ad[0](3);
  ed[0][1]=md(1)[1]*c[0][1]*c[1][0]*e[1][0]*c[3][0]*e[3][0]+md[1][5]*c[0][3]*c[1][2]*e[1]
  [0]*c[3][1]*e[3][1]+md[1](3]*c[0][1]*c[1][1]*e[1][1]*c[3][0]*e[3][0]+md[1][7]*c[0][3]*
  c[1][3]*e[1][1]*c[3][1]*e[3](1);
  ed[1][0]=md(1)[0]*c[0][0]*e[0][0]*c[1][0]*c[3][0]*e[3][0]+md[1][4]*c[0][2]*e[0][0]*c[1]
  [2]*c[3][1]*e[3][1]+md[1][1]*c(0)[1]*e[0][1]*c(1][0]*c(3][0)*e[3](0)+md[1][5]*c(0][3]*
  e[0][1]*c[1][3]*c[3][1]*e(3)(1);
  ed[1][1]=md[1][2]*c(0)(0)*e[0][0]*c(1)(1)*c(3)(0)*e(3)(0)+md(1)(6)*c[0][2]*e[0][0]*c[1]
  [3]*c(3)(1)*e(3)[1)+md[1][3]*c[0](1)*e[0][1]*c(1)(1)*c[3][0]*e(3)(0)+md(I)(7)*c[0][3]*
  e[0](1)*c[1][3]*c(3)(1)*e[3](1);
    mv[1][0)=c[0][0]*e[0][0]*c[1][0]*e(I)[0]*c(3)(0)*e[3][0];
    mv[1][4]=c[0][2)*e[0][0]*c[1][2]*e[1][0]*c[3][1]*e(3)(1);
    av[0](0)=mv[1][0]+mv[1][4];
    mv(1)[1]=c[0][1]*e[0][1]*c[1][0]*e(I)(0)*c(3)(0)*e(3)[01;
    mv(1)(5)=c[0][3]*e(0)[1]*c[1](2)*e[1][0]*c(3)(I)*e(3)[1];
    av(01[1]=mv[1](1)+mv(1)[5];
    mv(1)(2)=c[0](0]*e(0)(0)*c(1)(1)*e[1][1]*c[3](0)*e[3][0];
    mv[1][6]=c[0](2]*e[0][0]*c[1](3)*e(1](1)*c[3][1]*e(3)(1);
    av(0)[2]=mv(1][2]+mv[1][6];
    mv(1)(3)=c[0][1]*e[0][1]*c[1][1]*e(1)(1)*c[3][0]*e(3)(0);
    mv[1][7]=c(0)(3)*e(0)(1)*c(1)(3)*e[1](1)*c(3)(1]*e(3)(1);
    av[0][3]=mv[1][3]+mv(1)[7];
  ed[2][0]=md[0][0]*av[0][0]*c[2](0)+md(0)(1)*av(0)(1)*c[2][2]+md[0][2]*av[0][2]*c[2][4]
  +md(0)(3)*av(0)(3)*c(2)(6);
  ed[2][1]=md[0][4]*av[0][0]*c[2][1]+md[0][5]*av(0)[1]*c[2][3]+md(0)(6)*av[0)(2)*c[2](5)
  +md[0](7)*av[0][3]*c(2)(7);
  ed[3][0]=md[1][0]*c(0)(0)*e[0][0]*c[1](0)*e[1](0)*c[3][0]+md(I)[1]*c[0][1]*e[0][I]*c[1]
  [0)*e[1][0]*c[3](0)+md(I)(2)*c(0)(0)*e[0][0]*c[1][1]*e[1][1]*c(3)[0]+md[1][3]*c[0][1]
  *e(0)[1]*c[1][1]*e[1](1)*c[3][0];
  ed(3)[1]=md[1][4]*c[0][2]*e(0)[0]*c[1][2]*e[1][0]*c[3][1]+md[1](5)*c[0][3]*e(0)[1]*c(I]
  [2]*e[1](0)*c(3)(1)+md[1](6)*c(0)[2]*e(0)(0)*c(1)[3]*e[1][1]*c(3)[1]+md(1)[7]*c[0](3)
  *e(0)(1)*c(1]131*e(1)[1]*c(3)[1];
    normalizeBeliefs( );
    }
    private void normalizeBeliefs( )
    {
    b(0)(0)=e(0)(0)*ed(0)(0);
    b[0][1]=e[0][1]*ed(0)(1);
    b[1][0]=e[1](0)*ed[1][0];
    b(1)(1)=e(1)(1)*ed[1][1];
    b[2][0]=e(2)[0]*ed[2][0];
    b(2)(1)=e[2](1)*ed[2][1];
    b[3][0]=e[3][0]*ed[3](0);
    b[3][1]=e(3)(1)*ed(3)[1];
      for (int i=0, length=b.length; i<length; ++i)
      {
        double sum = 0.0;
        for (int j=0, length2=b(i).length; j<length2; ++j)
        {
```

APPENDIX-continued

Automatically Generated Source Code For Calculating Beliefs In The BN Shown In FIG. 4

```
            sum += b[i](j);
        }
        for (int j=0, length2=b[i].length; j<length2; ++j)
        {
            b[i][j] /= sum;
        }
    }
    modified = false;
}
/** b(i)(j) = belief for state j of node i */
private double[ ][ ] b;
/** true when something changed and beliefs need to be recalculated */
private boolean modified = true;
/** these five arrays store partial results of belief calculations */
private double[ ][ ] mv, md, av, ad, ed;
/////////////////////////////////////////////////////////////
/////////////////////////////////////////////////////////////
// evidence API
public double[ ] getEvidence(int variable)
(
return e[variable];
)
public void setEvidence(int variable, double[ ] evidence)
(
    modified = true;
    for (int i = 0, length    evidence.length; i < length; ++i)
    (
      e[variable)[i] = evidence[i];
    }
}
public void clearEvidence(int variable)
{
    modified = true;
    for (int i = 0, length = e[variable].length; i < length; ++i)
    (
        e(variable)[i] = 1.0;
    }
}
public void clearAllEvidence(
)
    modified = true;
    for (int i = 0, length = e.length; i < length; ++i)
    {
        for (int j = 0, length2 = e[i].length; j < length2; ++j)
        {
        e(i] [j] = 1.0;
        }
    }
}
/** e(i)[j) = evidence for state j of node i */
private double[])(1 e;
/////////////////////////////////////////////////////////////
/////////////////////////////////////////////////////////////
// conditional probability API
public double getConditionalProbability(int variable, int configuration)
(
    return c(variable) [configuration];
}
public void setConditionalProbability(int variable, int configuration, double
probability)
(
    modified = true;
c(variable)(configuration) = probability;
)
/** c(i)(j) = conditional probability for configuration j of node i */
private double[ ][ ] c;
/////////////////////////////////////////////////////////////
/////////////////////////////////////////////////////////////
// node state name API
public int getVariable(String name)
(
    for (int i = 0, length = n.length; i < length; ++1)
    (
      if (n[i].equals(name))
      (
        return i;
      ]
```

APPENDIX-continued

Automatically Generated Source Code For Calculating Beliefs In The BN Shown In FIG. 4

```
   return -1;
)
public String getVariableName(int variable)
(
return n(variable);
)
public String( ) getStates(int variable)
{
return s(variable);
(
public int getVariableCount(1)
(
return n.length;
)
public int getStateCount(int variable)
{
    return s[variable].length;
}
/** n[i] = name of node i */
private String( ) n;
/** s[i][j] = name of state j of node i */
private String[ ][ ] s; ///////////////////////////////////////////////////
)
```

What is claimed is:

1. A system for computing probabilities of variables in a belief network, the system comprising:
    a data acquisition interface configured to receive data representative of the belief network;
    a partial evaluator configured to carry out a partial evaluation algorithm that determines the probability calculations that must be performed on the received data in order to compute the probabilities of the variables in the belief network; and
    a source code generator configured to output the probability calculations as a source code in a programming language;
    wherein the partial evaluation subsystem is configured to perform an optimization, and wherein the optimization comprises at least one of:
        an optimization in which at least some of the CPD entries are locked into their initial values so as to remain unchanged during run-time; and
        an optimization in which at least some of the evidence values for non-input nodes are locked to one so as to remain unchanged at run-time.

2. A system for computing probabilities of variables in a belief network, the system comprising:
    a data acquisition interface configured to receive data representative of the belief network;
    a partial evaluator configured to carry out a partial evaluation algorithm that determines the probability calculations that must be performed on the received data in order to compute the probabilities of the variables in the belief network; and
    a source code generator configured to output the probability calculations as a source code in a programming language;
    wherein the partial evaluation subsystem is configured to perform an optimization, wherein the optimization comprises at least one of:
        an optimization in which when a constant term in the probability calculations is less than a predetermined value, the term is set to zero; and
        an optimization in which when a constant term in the probability calculations is greater than a predetermined value, the term is set to one.

3. A system for computing probabilities of variables in a belief network, the system comprising:
    a data acquisition interface configured to receive data representative of the belief network;
    a partial evaluator configured to carry out a partial evaluation algorithm that determines the probability calculations that must be performed on the received data in order to compute the probabilities of the variables in the belief network; and
    a source code generator configured to output the probability calculations as a source code in a programming language;
    wherein the partial evaluation subsystem is configured to perform an optimization, wherein the optimization comprises at least one of:
        an optimization in which when a term is multiplied by zero, the term is removed from the probability calculations;
        an optimization in which when zero is added to a term, the zero is removed; and
        an optimization in which when one is multiplied to a term, the one is removed.

4. A system for computing probabilities of variables in a belief network, the system comprising:
    a data acquisition interface configured to receive data representative of the belief network;
    a partial evaluator configured to carry out a partial evaluation algorithm that determines the probability calculations that must be performed on the received data in order to compute the probabilities of the variables in the belief network; and a source code generator configured to output the probability calculations as a source code in a programming language;

wherein the partial evaluation subsystem is configured to perform an optimization;

the system further comprising a user interface configured to specify one or more optimizations to be performed, and further configured to specify one or more parameters required by the selected optimizations.

5. A system for computing probabilities of variables in a belief network, the system comprising:

a data acquisition interface configured to receive data representative of the belief network;

a partial evaluator configured to carry out a partial evaluation algorithm that determines the probability calculations that must be performed on the received data in order to compute the probabilities of the variables in the belief network; and a source code generator configured to output the probability calculations as a source code in a programming language;

wherein the belief network comprises a disconnected network that includes multiple groups of nodes that are not connected to each other, and wherein the system is further configured to produce probability calculations for the disconnected network.

* * * * *